(12) United States Patent
Hirose et al.

(10) Patent No.: US 6,377,770 B1
(45) Date of Patent: *Apr. 23, 2002

(54) SLIDING MEMBER SLIDING BEARING UNIT AND DEVELOPING APPARATUS

(75) Inventors: Kazuo Hirose, Yokkaichi; Takashi Minami, Kuwana; Fuminori Satoji, Yokkaichi; Eiichiroh Shimazu, Mie-ken, all of (JP)

(73) Assignee: NTN Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/888,061

(22) Filed: Jul. 3, 1997

(30) Foreign Application Priority Data

Jul. 9, 1996 (JP) ................................ 8-179691

(51) Int. Cl.$^7$ .......................... G03G 15/08; C08G 63/48
(52) U.S. Cl. .......................... 399/286; 525/70
(58) Field of Search ................. 399/286, 279, 399/265, 111; 524/495, 496, 269; 525/64, 63, 70, 146

(56) References Cited

U.S. PATENT DOCUMENTS

| | | | | |
|---|---|---|---|---|
| 4,703,075 A | * | 10/1987 | Egami | 524/269 |
| 4,787,991 A | | 11/1988 | Morozumi et al. | 508/112 |
| 4,877,813 A | * | 10/1989 | Jinno et al. | 525/146 |
| 4,978,463 A | | 12/1990 | Satoji | 508/304 |
| 5,310,792 A | * | 5/1994 | Inoue | 525/64 |
| 5,352,738 A | * | 10/1994 | Hiromoto et al. | 525/70 |
| 5,415,791 A | * | 5/1995 | Chou et al. | 508/103 |
| 5,501,526 A | * | 3/1996 | Asai et al. | 384/13 |
| 5,701,562 A | * | 12/1997 | Araki et al. | 399/265 |
| 5,750,616 A | * | 5/1998 | Shimpuku et al. | 524/496 |
| 5,814,697 A | * | 9/1998 | Akao et al. | 524/495 |

OTHER PUBLICATIONS

JP–2–71893 (English Abstract), "Lubricating Oil for Hydrogen–Containing Chlorofluorocarbon Refrigerant".
JP–3–285952 (English Abstract), "Aromatic Polymide Resin Composition for Sliding Component".

* cited by examiner

Primary Examiner—Arthur T. Grimley
Assistant Examiner—Hoan Tran
(74) Attorney, Agent, or Firm—Hedman & Costigan, P.C.

(57) ABSTRACT

A sliding member composed of a molded resin composition containing at least synthetic resin, polyolefin resin, and oil. This composition allows a sliding resistance to be small and a small torque to be applied to a sliding bearing unit.

30 Claims, 2 Drawing Sheets

SLIDING MEMBER SLIDING BEARING UNIT AND DEVELOPING APPARATUS

BACKGROUND OF THE INVENTION

The present invention relates to a sliding member and more particularly to a sliding member composed of resin, a sliding bearing unit comprising the sliding member and a developing apparatus comprising the sliding member.

There is a growing demand for the development of electrophotographic copying machines, printers, facsimiles and the like miniaturized, easy to operate, and inexpensive. In such a trend, a developing apparatus of process cartridge type which is compact, light, and easy to use, and removably installed inside electrophotographic copying machines, printers, facsimiles has been developed.

As a bearing device for use in the sliding portion of a developing apparatus, oil-contained and sintered sliding bearing unit and a sliding bearing unit composed of resin are increasingly used instead of a rolling bearing unit in recent years. The sliding bearing unit composed of resin is adopted more than the oil-contained and sintered sliding bearing unit because the former has a smaller degree of change in its sliding characteristic relative to the change in temperature than the latter.

Generally, the sliding bearing portion of the conventional sliding bearing unit composed of resin comprises a sliding member formed of synthetic resin impregnated with lubricating oil or comprises synthetic resin to which a lubricating component is added. For example, the former sliding member contains lubricating oil dispersed in the synthetic resin such as polyphenylene sulfide or polyacetal. The latter sliding member contains polytetrafluoroethylene or modified polyethylene mixed with the synthetic resin. For example, an aromatic polyamide resin composition which is processed into the sliding member and contains aromatic polyamide and modified polyethylene mixed therewith is known as disclosed in Laid-Open Japanese Patent Publication No. Hei3-285952.

The sliding bearing unit in which the bearing portion comprises the sliding member containing lubricating oil is most widely used because of its superior sliding characteristic.

The conventional sliding member and in particular, the sliding bearing unit composed of the synthetic resin impregnated with the lubricating oil, however, a problem that its sliding resistance increases with age. More specifically, in the conventional sliding bearing composed of the synthetic resin impregnated with the lubricating oil, frequently, the lubricating oil is held in the resin in the form of capsule. Thus, only the oil positioned in the surface layer of the resin contributes to the lubrication of the sliding bearing, whereas the oil positioned in the interior thereof does not contribute to the lubrication thereof. Consequently, the oil positioned in the surface layer of the resin composition decreases to the minimum, which may lead to seizing.

In particular, a bearing installed at both ends of the shaft of a photosensitive roller serving as a toner-carrying member or a latent image-holding member constituting a developing apparatus is prevented from rotating at a uniform speed due to fluctuation in sliding resistance with the elapse of time, thus making it difficult to form a preferable image. If a large motor is used in the developing apparatus to generate a great torque in order to prevent the photosensitive roller or the like from rotating at a nonuniform speed, it is difficult to produce a compact inexpensive developing apparatus.

SUMMARY OF THE INVENTION

The present invention has been made to solve the problems. It is accordingly an object of the present invention to provide a sliding member composed of resin and a sliding bearing unit both having a low degree of sliding resistance; and a developing apparatus comprising the sliding bearing unit and allowing the driving torque thereof to be small.

The present invention provide a sliding member composed of a molded resin composition, the composition comprising a synthetic resin, a polyolefin resin, and an oil.

The molded resin composition comprises that 0.5–30 parts by weight of the oil is added to 100 parts by weight of a resin comprising 100 parts by weight of the synthetic resin and 5–200 parts by weight of the polyolefin resin.

The polyolefin resin comprises at least one resin selected from the group consisting of polyethylenes and modified polyethylenes.

The oil comprises at least one oil selected from the group consisting of silicone oil and ester oil. Preferably, the oil consists of ester oil.

Preferably, the synthetic resin is a polyamide resin. Preferably, the polyamide resin is polycaprolactam or polylaulolactam.

Preferably, the resin composition further comprises an oil-preserving material and a pigment. Preferably, the pigment is a black pigment.

Another sliding member of the present invention composed of a molded resin composition, the composition comprising a polyamide resin having a chemical structure containing not less than 10 methylene units between amide bonds, and an oil.

The sliding member contains 100 parts by weight of the polyamide resin and 1–25 parts by weight of the oil.

Preferably, the polyamide resin is polylaulolactam.

The resin composition of the sliding member further comprises an oil-preserving material and a pigment such as a black pigment.

The sliding bearing unit of the present invention comprises the sliding member installed at the sliding bearing portion.

The sliding bearing unit can be preferably applied to a developing apparatus comprising an electrostatic latent image-forming means, a toner supply means, a developing means, and a transfer means.

In particular, the sliding bearing unit is constituted as a process cartridge.

As a result of their researches made on the oil preserving state and sliding characteristic of the sliding member composed of resin containing oil, the present inventors have found that the sliding member composed of the polyolefin resins and the oil has a low degree of initial sliding resistance and that the sliding resistance does not increase with age. This is attributed to the fact that the oil has a high degree of affinity for the polyolefin resins having methylene groups and dispersed uniformly in the sliding member composed of the resin containing the oil. That is, the oil is movably preserved in the sliding member. The present invention has been developed on the basis of such a discovery.

That is, the sliding member of the present invention has a structure in which the polyolefin resin and the oil coexist.

The polyamide or the like having a structure in which a large number of methylene groups having a preferable affinity for the oil is present in its molecules provides the superior sliding characteristics even though the polyolefins are not present therewith.

The sliding member of the present invention maintains its superior initial lubricating characteristics for a long time. Thus, the sliding bearing unit comprising the sliding member is reliable because seizing does not occur. The developing apparatus of the present invention allows the driving torque to be reduced because the sliding bearing unit is used at the shaft-supporting portion thereof. Consequently, developing apparatus forms a preferable image and can be allowed to be compact and light weight.

DESCRIPTION OF THE PREFERRED EMBODIMENTS

Figure 1:
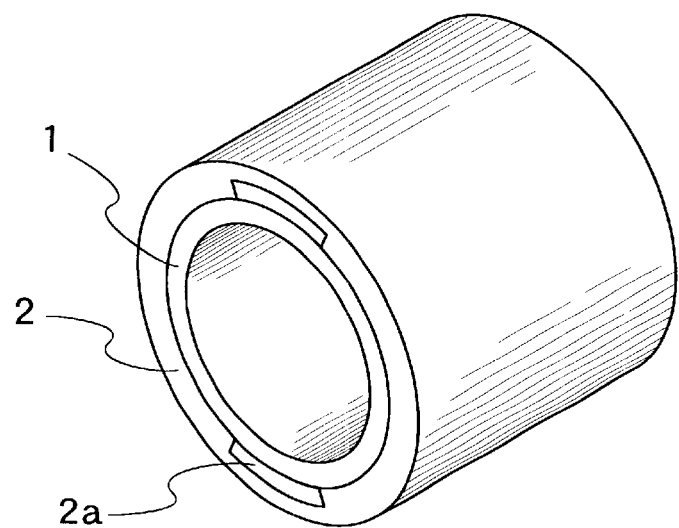
FIG. 1 is a view showing an example of a sliding bearing unit of the present invention.

A resin composition containing polyolefin resins is molded to form the sliding member of the present invention. The polyolefin resin according to the present invention can be used without limitation so long as it has a preferable affinity for oil. The polyolefin resin includes polyethylenes such as low-density polyethylene, linear low-density polyethylene, medium-density polyethylene, high-density polyethylene, and ultra-high-molecular-weight polyethylene; and polypropylene. These resins can be used solely or in the form of a mixture, copolymerizate, and modified substance. These resins are more favorable than other resins because the polyolefin resins contained therein have a unit indicated by the following chemical formula and are compatible with synthetic resins such as polyamide resins and less expensive than other resins.

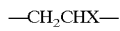

where X is at least one group selected from H, $CH_3$, Cl, OH, and aromatic ring.

In consideration of the compatibility with polyamide resins, the polyethylenes can be favorably used as the polyolefin resin of the present invention. Modified polyethylene is more favorable than the unmodified polyethylenes. The modified polyethylene obtained by grafting a graft monomer such as α, β-unsaturated carboxylic acid or its derivatives with the polyethylenes is preferable. As the α, β-unsaturated carboxylic acid, the following substances are preferable: acrylic acid, methacrylic acid, maleic acid, fumaric acid, tetrahydrophthalic acid, itaconic acid, citraconic acid, crotonic acid, and endocis-bicyclo[2,2,1] hepto-5-ene 2,3-dicarboxylic acid. Maleic acid and endocis-bicyclo[2,2,1] hepto-5-ene 2,3-dicarboxylic acid are the most favorable.

It is possible to use oil which can be present together with the polyolefin resin and improves the lubricating properties thereof as the oil according to the present invention. The following oils can be exemplified: silicone oil, polyglycol oil, oligomer oil of olefins, perfluoroalkyl ether oil, perfluoropolyether oil, polyphenyl ether oil, ester oil, alkylbenzene oil, paraffin oil, naphtene oil, phosphoric ester oil, polyol ester oil, diester oil, silicate ester oil, fatty ester oil, and polycarbonate oil.

Heat resistant oils are favorable materials of the sliding member. Thus, silicone oil and ester oil can be preferably used as the oil of the present invention. It is preferable to use silicone oil and ester oil solely.

As the silicone oil, it is possible to use a polymer of dimethylsiloxane and its derivatives obtained by replacing methyl groups or a part of a polymer with at least one kind of aliphatic or aromatic groups such as hydrogen, phenyl group, halogenated phenyl group, halogenated alkyl group, fluoroester groups. Such silicone oils are compounds having no functional groups. But it is possible to use silicone oil having functional groups. Organopolysiloxane is a compound obtained by introducing functional groups into a polymer consisting of one kind of siloxane or a copolymer formed of two kinds of siloxane such as methyl siloxane, methylphenyl siloxane, trimethyl fluoropropyl siloxane and the like. The functional groups include epoxy group, amino group, carboxylic group, hydroxyl group, mercapto group, isocyanate group, cyanate group, and vinyl group.

The silicone oil is nonflammable polymertype oil. Preferably, the viscosity of the oil is more than 50 cst, more preferably, more than 500 cst, the most preferably, the viscosity of the oil is in a range of 5,000–500,000 cst at 25–40° C., by regulating a molecular weight of the polymer.

Ester oil consists of a compound having in its molecule ester bond formed by the reaction of hydroxyl group with carboxylic group.

Ester oil formed by the reaction of polyvalent alcohol such as trimethylolethane, trimethylolpropane, and pentaerythritol with monovalent aliphatic acid or polybasic acid is preferable, as disclosed in Laid-Open Japanese Patent Publication No. Hei3-128992. In particular, full ester of pentaerythritol is preferable owing to its stable heat-resistant property. Further, partial ester having a high degree of affinity for methylene group can be preferably used. These esters having no hydrogen atoms at the β-position of carbon atoms derived from alcohols are preferable. As necessary, the resin composition of the present invention may contain extreme pressure additive containing sulfur, phosphorous, halogen or other additives such as wear resistance-improving agent, antioxidant, heat resistance-improving agent, corrosion inhibitor, hydrolysis-preventing agent, and anti-foaming agent.

Preferably, the oil according to the present invention has a viscosity at which the oil does not come out rapidly from the sliding member even though a friction heat is generated when the sliding member slides. More specifically, preferably, the viscosity of the oil is in a range of 5–500,000 cst at 40° C. If the viscosity thereof exceeds the range, there is a possibility that the oil is dispersed in the resin composition at an insufficient degree at the time of granulation of molding pellet and injection molding. For the above mentioned reason the viscosity of the oil is at least more than 10 cst, preferably 20–200 cst at 100° C., and at least more than 20 cst, preferably 40–400 cst at 25–40° C. The viscosity index of the oil is in the range of 100–500, preferably 150–300 depending on the kind of the oil. The flash point of the oil is at least more than 200° C., preferably 250–500° C. If the flash point thereof is in the above range, it satisfy nonflammability and safety for fires.

The synthetic resin according to the present invention is not limited to a specific one, but the following thermoplastic resins and thermosetting resins can be used. The synthetic resin of the present invention is one or more synthetic resins different fromthe above-described polyolefin resins.

More specifically, the synthetic resins include thermoplastic resins such as polytetrafluoroethylenechlorotrifluoroethylene resin, a copolymer of tetrafluoroethylene and hexafluoropropylene, a copolymer of tetrafluoroethylene and perfluoroalkylvinylether, vinylidene fluoride resin, a copolymer of ethylene and tetrafluoroethylene, a copolymer of ethylene and chlorofluoroethylene, polyvinylidene chloride resin, chlorinated polyolefin resin, a copolymer of ethylene and vinyl acetate, a copolymer of ethylene and ethyl acrylate, acrylonitrile/butadiene/styrene resin, polyamide resin, methacrylate resin, polyacetal resin, polycarbonate resin, cellulose resin, polyurethane resin, polyimide resin, polyetherimide resin, polyamideimide resin, ionomer resin, polyphenylene oxide resin, polyaryl sulfone resin, polyaryl ether resin, polyether ether ketone resin, polyphenylene sulfide resin, polysulfone resin, aromatic polyester resins, and polyethylene terephthalate resin; and thermosetting resins such as phenol resin, urea resin, melamine resin, melamine/phenol copoly-condensated resin, xylene-modified phenol resin, urea guanamine copoly-condensated resin, amino resin, acetoguanamine resin, melamine guanamine resin, alkyd resin, diaryl phthalate resin, xylene resin, epoxy resin, epoxy acrylate resin, silicone resin, and urethane resin.

Of the above-described synthetic resins, those which can be formed by injection molding is superior in productivity because sliding members such as sliding bearings can be manufactured efficiently. The thermoplastic resin which can be formed by injection molding is preferable because they are favorable in productivity and shape-forming property. Of these synthetic resins, non-polyolefin resins can be appropriately selected.

Of these resins, polyamide resin can be used very favorably as the synthetic resin of the present invention because they are compatible with the polyolefin resin and oil and have a superior lubricating property.

Polyamide resins include aliphatic polyamide resins such as polyhexamethylene adipamide (6,6-nylon), polyhexamethylene azelamide (6,9-nylon), polyhexamethylene dodecamide (6,12-nylon), polytetramethylene adipamide (4,6-nylon), polycaprolactam (6-nylon), polylaulolactam (12-nylon), poly-11-amino undecylic acid (11-nylon), polymethaxylene adipamide (nylon MXD-6); and aromatic polyamide resins such as polymethaphenylene isophthalamide and polyparaphenylene terephthalamide. These polyamide resins can be used solely or in the form of a mixture. As the main synthetic resin of the present invention, aliphatic polyamide resin is particularly favorable because it is compatible with the polyolefin resin, thus displaying a favorable lubricating property. In particular, polycaprolactam (6-nylon) resin is preferable because it is very compatible with the polyolefin resin.

It has been confirmed by the present inventors that polyamide resins such as poly-11-amino undecylic acid (11-nylon), polylaulolactam (12-nylon) having a chemical structure containing at least 10 methylene units between amide bonds have a high degree of oil-preserving performance although they do not contain the polyolefin resin. This is attributed to the presence of comparatively long methylene units contained in the molecules thereof. Accordingly, the polyamide resins containing at least 10 methylene units are capable of composing a superior sliding member by combining them with silicone oil or ester oil although they do not contain the polyolefin resin.

The mixing ratio of the polyolefin resin and the oil which is selected in forming them into the sliding member of the present invention will be described below.

In composing the sliding member of the present invention, preferably, 5–200 parts by weight of the polyolefin resin is added to 100 parts by weight of synthetic resin consisting of the polyamide resin. Preferably, 0.5–30 parts by weight of oil is added to 100 parts by weight of the synthetic resin containing the polyolefin resin. If the part by weight of the polyolefin resin is less than 5, the sliding member composed of the resin composition containing the polyolefin resin is incapable of reducing the degree of torque sufficiently. If the part by weight of the polyolefin resin is more than 200, there is a possibility that the dimensional accuracy of a molded product deteriorates. If the part by weight of the oil is less than 0.5, the torque cannot be reduced sufficiently. If the part by weight of the oil is more than 30, there is a possibility that a resin composition having a stable composition cannot be obtained. As the more favorable range of the mixing ratio which reduces the torque and provides a favorable dimensional accuracy, 20–150 parts by weight of the polyolefin resin is added to 100 parts by weight of the synthetic resin composed of the polyamide resin or the like; and 5–30 parts by weight of the oil is added to 100 parts by weight of the synthetic resin containing the polyolefin resin.

As another favorable mixing ratio of the resin and the oil in forming the sliding member, 1–25 parts by weight of the oil is added to 100 parts by weight of the polyamide resin. In this mixing ratio of the oil, it is possible to obtain the sliding member allowing the torque to be reduced sufficiently and the size dimension thereof to be accurate. More favorably, 10–20 parts by weight of the oil is added to 100 parts by weight of the polyamide resin.

The sliding member of the present invention is capable of containing an oil-preserving material. As the oil-preserving material, it is possible to use a material capable of migrating the silicone oil or the ester oil from the sliding member at an appropriate speed. An inorganic porous material having a great specific surface area can be preferably used. The oil-preserving materials include talc, clay, calcium carbonate, carbon, graphite, active carbon, and the like.

Favorably, 1–25 parts by weight of the oil-preserving material is mixed with 100 parts by weight of a resin composition containing the synthetic resin, the polyolefin resin, and the oil or with 100 parts by weight of a resin composition containing the polyamide resin and the oil. If the part by weight of the oil-preserving material is less than one, it is difficult to obtain oil-preserving effect, whereas if the part by weight of the oil-preserving material is more than 25, oil held by the oil-preserving material does not migrate from the resin composition at an appropriate speed. Consequently, the torque increases. More favorably, 1–10 parts by weight of the oil-preserving material is mixed with 100 parts by weight of the resin composition.

As necessary, the sliding member of the present invention is capable of containing additives such as inorganic filler, ultraviolet ray-absorbing agent, antioxidant, colorant, and fire-retardant agent. The sliding member can be formed preferably by injection molding which is superior in productivity.

It is preferable to use the colorant such as black pigment for the reason which is described below.

Wastes such as sprues, runners, defective goods, and the like are demanded not to be treated as industrial wastes but recycled in view of the protection of environment and resources. In recycling wastes, it is necessary that the sliding member composed of a mixture of a reclaimed material and an unused material maintains the property of the one composed of the reclaimed material and its appearance.

In the sliding member of the present invention, it has been found by the present inventors that the use of the colorant such as the black pigment allows the physical property of the sliding member including its appearance to be maintained, although the resin composition contains wastes in a predetermined range. Favorably, not more than seven parts by weight of the black pigment is mixed with 100 parts by weight of the resin composition. More favorably, from 0.5–4 parts by weight thereof is mixed with 100 parts by weight of the resin composition. This range is sufficient for coloring the resin composition. If the part by weight of the black pigment is more than seven, a molded product has a low weld strength and cannot be used as the sliding member.

The sliding member according to the present invention can be obtained by mixing the above-described materials with each other and pelleting the mixture and molding it. More specifically, the above-described materials are mixed with each other by a mixer such as a Henshell mixer, a ball mill, a tanbler mixer and then, the mixture is supplied to an injection molding apparatus having a favorable melt-mixing performance. Otherwise, the mixture is melted and kneaded by a roller, a kneader, a Banbury mixer, a melt extruder, and then, pelleted. Then, the pelleted material is formed into a molded product having a predetermined shape by injection molding, compression molding or extrusion molding. In mixing the materials with each other, it is possible to pellet only the synthetic resin containing the polyolefin resin and then melt the oil and oil-preserving material, and then the melted oil and oil-preserving material is mixed with the pelleted material.

Because the sliding member of the present invention is superior in its lubricating characteristic, it can be applied to the sliding bearing, the sliding bearing units and sealing materials of office machines, information equipments, vehicles and it's parts, electrical equipments, domestic appliances.

In the sliding bearing unit of the present invention, at least the sliding bearing portion thereof is constituted of the above-described sliding member. Thus, the entire sliding bearing unit including a housing can be composed of the sliding member of the present invention. Further, only the sliding bearing portion can be composed of the sliding member.

An example of the sliding bearing unit of the present invention is described below with reference to FIG. 1 showing an example of a sliding bearing unit comprising a housing 2 and a sliding member 1 combined with each other through a rotation stop member 2a. In this example, the sliding member has sliding characteristics, whereas the housing has characteristics such as mechanical characteristics and durability other than the sliding characteristics. Thus, the sliding bearing unit has a superior sliding characteristics and mechanical characteristics. Further, because of such a construction, if a load is applied to the sliding bearing unit in one direction, the sliding member can be located in a direction in which the load is applied.

The sliding bearing unit of the present invention has a small degree of deterioration in its initial sliding characteristic. Further, its sliding characteristic does not deteriorate greatly with age. Thus, the sliding bearing unit can be preferably applied to the bearing portion of office machines and that of audio visual equipments.

The developing apparatus of the present invention comprises the above-described sliding bearing unit positioned at a portion of a unit constituting each of an electrostatic latent image-forming means, a toner supply means, a developing means, and a transfer means.

The electrostatic latent image-forming means charges an electrostatic latent image-holding member, for example, a photosensitive drum or a photosensitive belt so that an electric potential is applied to the surface of the electrostatic latent image-holding member and an electrostatic latent image is formed thereon by means of an exposure means. The toner supply means feeds toner accommodated in a developing housing to a developing roller confronting the electrostatic latent image-holding member. The developing means develops the electrostatic latent image formed on the electrostatic latent image-holding member into a visible image with the toner supplied to the developing roller. The transfer means transfers the visible image to an image-supporting material such as paper.

Figure 2:
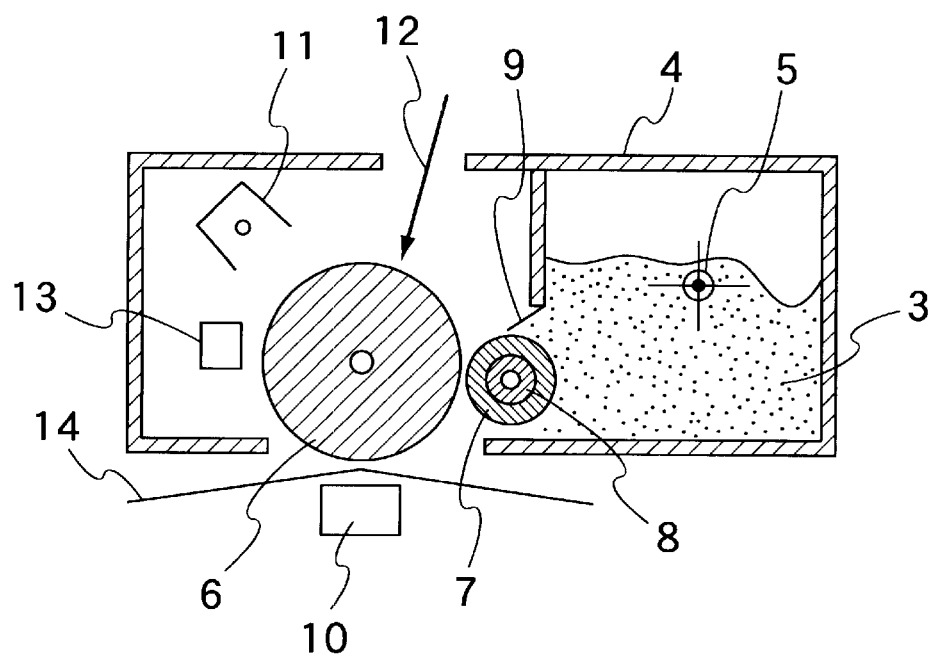
FIG. 2 is a view showing an example of a developing apparatus of the present invention.

An example of a developing apparatus comprising the sliding bearing unit of the present invention installed at the shaft-supporting portion thereof is described below with reference to FIG. 2. A two-component developing method is carried out in the developing apparatus.

The developing apparatus comprises a container 4 containing a toner 3, an agitation member 5 for agitating the toner 3 contained in the container 4, a developing roller 7 confronting an electrostatic latent image-holding member 6, a magnetic member 8 accommodated in the developing roller 7, a toner-regulating member 9 for regulating the amount of the toner 3 which is supplied to the developing roller 7, and a transfer device 10. In addition, the developing apparatus comprises a charging device 11, an exposing device 12 for emitting laser beams, a cleaning device 13, and a paper-feeding path 14.

A torque for rotating each shaft can be allowed to be small by using the sliding bearing unit of the present invention superior in its sliding characteristic as the supporting bearing of the agitation member 5, the electrostatic latent image-holding member 6, and the developing roller 7. Consequently, a compact driving device can be used, which enables a compact and light weight developing apparatus to be used. Thus, the sliding bearing unit can be preferably used as for a process cartridge of the electrostatic latent image-forming means, the toner supply means, and the developing means.

Figure 3:
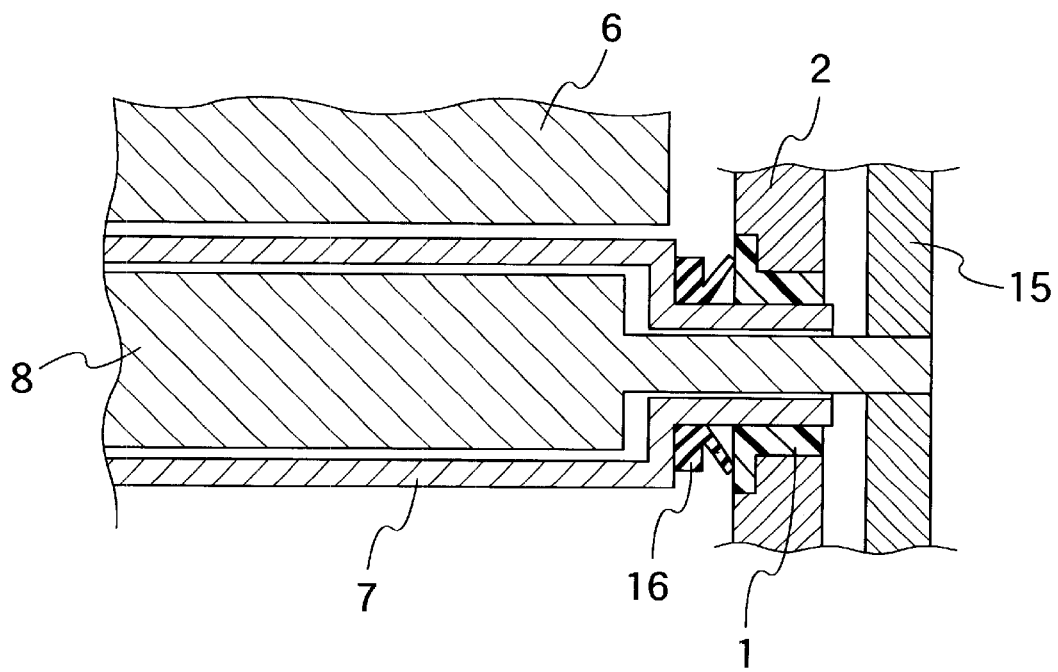
FIG. 3 is a view showing a sliding member of a process cartridge comprising the sliding bearing unit of the present invention.

FIG. 3 shows an example of a process cartridge comprising the sliding bearing unit of the present invention.

A sliding member 1 which is pressed fitting in a housing 2 supports an end of the shaft of the developing roller 7 confronting the electrostatic latent image-holding member 6. The developing roller 7 composed of soft metals such as aluminum alloy contains the magnetic member 8 and supplies the toner 3 to an electrostatic latent image formed on the surface of the electrostatic latent image-holding member 6. Reference numerals 2, 15, and 16 in FIG. 3 show a housing, a casing, and a rubber sealing having a lip portion, respectively.

The sliding member 1 of the present invention supports an end of the shaft of the developing roller 7, and also has a flange at one side. The flange slide thrustly with the lip portion of the rubber sealing 16. The flange can seal toner 3 and support a thrusting portion of the sliding member 1 to the developing roller 7.

Because the process cartridge allows the torque of the developing roller 7 to be small, the shaft is allowed to rotate at a uniform speed. Consequently, a preferable image can be formed.

Embodiment 1

A polymer alloy was formed by mixing 100 parts by weight of polycaprolactam (6-nylon) resin (Amilan CM1007 (trade name of Toray Industries Co., Ltd.)) and 150 parts by weight of modified polyethylene with each other. Then, 7.5 parts by weight of ester oil (Unister H-481R (trade name of NOF Co., Ltd.)) was added to 100 parts by weight of the polymer alloy. The mixture was formed into the shape of a sliding bearing by injection molding. The modified polyethylene was formed by reacting maleic anhydride and high molecular weight polyethylene (Lubmer L 4000 manufactured by Mitsui Petrochemical Industries Co., Ltd.) with each other by graft polymerization. The modified polyethylene can be alloyed easily with polycaprolactam (6-nylon). Also, the ester oil comprises ester compound having no hydrogen atoms at the β-position of carbon atoms derived from alcohols (Unister H-481R (trade name of NOF Co., Ltd.)). The viscosity of the oil is 11.9 cst at 100° C., and 64.2 cst at 40° C. The viscosity index of the oil is 184. The flash point of the oil is 300° C. showing heat resistant property. The sliding bearing obtained had a test piece shape of a bearing to a friction torque-measuring apparatus for a low friction coefficient sliding bearing containing oil.

Figure 4:
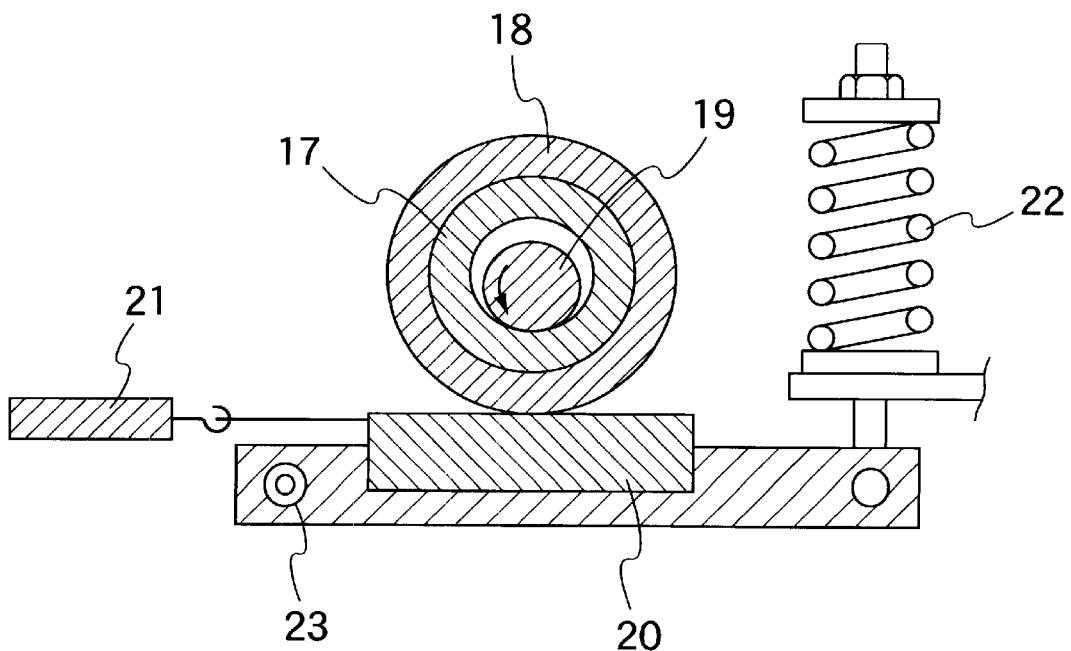
FIG. 4 is a view showing a friction torque-measuring apparatus.

The sliding characteristic of the obtained sliding bearing was measured. FIG. 4 shows a friction torque-measuring apparatus.

The friction torque-measuring apparatus comprises a housing 18 accommodating a bearing 17, a shaft 19 made of aluminum alloy, a static pressure-air linear bearing 20, a load cell 21, a load-applying coil spring 22, and a fulcrum 23. The frictional force between the bearing 17 and the shaft 19 was measured at the load cell 21 through the static pressure-air linear bearing 20. A load applied by the coil spring 22 through the static pressure-air linear bearing 20 was transmitted to the housing 18, thus pressing the housing 18 upward. The condition for measuring the torque is shown in table 1. Measured result is shown in table 3.

TABLE 1

| Item | Condition |
| --- | --- |
| Surface pressure | 25 kgf/cm$^2$ |
| Peripheral speed | 10 cm/sec. |
| Atmosphere | room temperature |
| Shaft | aluminum |
| Measured time period | 5 min.–70 hrs. |

Embodiment 2

A sliding bearing was formed by molding a material in the same condition and method as those of the embodiment 1 except that the ester oil was replaced with silicone oil (KF96H-6000 (trade name of Shin-Etsu Chemical Co., Ltd.)). The oil has 6,000±300 cst at 25° C. of viscosity and more than 315° C. of flash point.

Evaluations were made on the same items as those of the embodiment 1, using the obtained sliding bearing. Measured results are shown in table 3.

Embodiment 3

A sliding bearing was formed in the same condition and method as those of the embodiment 1 except that the mixing part by weight of the modified polyethylene was changed from 150 to 66.7. Evaluations were made on the same items as those of the embodiment 1, using the obtained sliding bearing. Measured results are shown in table 3.

Embodiment 4

A sliding bearing was formed in the same condition and method as those of the embodiment 1 except that the ester oil was replaced with the silicone oil. Evaluations were made on the same items as those of the embodiment 1, using the obtained sliding bearing. Measured results are shown in table 3.

Embodiment 5

A polymer alloy was formed by mixing 100 parts by weight of polylaulolactam (12-nylon) resin (Daiamid L1640 (trade name of Daicel-Huels Co., Ltd.)), 10 parts by weight of talc powder, and 15 parts by weight of the ester oil (Unister H-481R (trade name of NOF Co., Ltd.)) with each other. The mixture was pelleted and then formed into the shape of a sliding bearing by injection molding. The sliding characteristic of the obtained sliding bearing was evaluated on the same items as those of the embodiment 1. Measured results are shown in table 3.

Embodiment 6

A sliding bearing was formed by molding a material in the same condition and method as those of the embodiment 5 except that the ester oil was replaced with the silicone oil. Evaluations were made on the same items as those of the embodiment 1, using the obtained sliding bearing. Measured results are shown in table 3.

Embodiment 7

A sliding bearing was formed by molding a material in the same condition and method as those of the embodiment 5 except that the talc powder was replaced with active carbon. Evaluations were made on the same items as those of the embodiment 1, using the obtained sliding bearing. Measured results are shown in table 3.

Embodiment 8

A sliding bearing was formed by molding a material in the same condition and method as those of the embodiment 6 except that the talc powder was replaced with the active carbon. Evaluations were made on the same items as those of the embodiment 1, using the obtained sliding bearing. Measured results are shown in table 3.

Embodiment 9

A polymer alloy was formed by mixing 100 parts by weight of the polycaprolactam (6-nylon) resin (Amilan CM1007 (trade name of Toray Industries Co., Ltd.)) and 150 parts by weight of unmodified high molecular weight polyethylene (Lubmer L 4000 (trade name of Mitsui Petrochemical Industries Co., Ltd.)) with each other. Then, 10 parts by weight of the talc powder and 7.5 parts by weight of the ester oil (Unister H-481R (trade name of NOF Co., Ltd.)) was added to 100 parts by weight of the polymer alloy. The mixture was pelleted to form it into a sliding bearing. Evaluations were made on the same items as those of the embodiment 1, using the obtained sliding bearing. Measured results are shown in table 3.

Embodiment 10–Embodiment 13

A sliding bearing was formed in the same condition and method as those of the embodiment 1 at the mixing ratio shown in table 2. Evaluations were made on the same items as those of the embodiment 1, using the obtained sliding bearing. Measured results are shown in table 3.

COMPARISON EXAMPLE 114 COMPARISON EXAMPLE 5

Sliding bearings were formed in the same condition and method as those of the embodiment 1, using resin materials not containing the polyolefin resin. Comparison example 1; Oil-contained polyacetal resin (Duracon SW-01 (trade name of Polyplastics Co., Ltd.)) Comparison example 2; Oil-contained polyacetal resin (Duracon OL-10 (trade name of Polyplastics Co., Ltd.)) Comparison example 3; Oil-contained nylon resin (S-Bear SN520 (trade name of Starlite Co., Ltd.)) Comparison example 4; Polyphenylene sulfide resin (Gritron SE (trade name of Oiles Co., Ltd.)) Comparison example 5; Polyphenylene sulfide resin (Bearee AS5000 (trade name of NTN Engineering Plastics Co., Ltd.))

Evaluations were made on the same items as those of the embodiment 1, using the obtained sliding bearing. Measured results are shown in table 3.

TABLE 2

| | Synthetic resin *1 | Polyolefin resin Kind *1 | Polyolefin resin Ratio *2 | Oil Kind *1 | Oil Ratio *3 | Oil preserving material Kind *1 | Oil preserving material Ratio *4 |
|---|---|---|---|---|---|---|---|
| E 1 | R1 | P1 | 150 | L1 | 7.5 | — | — |
| 2 | R1 | P1 | 150 | L2 | 7.5 | — | — |
| 3 | R1 | P1 | 66.7 | L1 | 7.5 | — | — |
| 4 | R1 | P1 | 66.7 | L2 | 7.5 | — | — |
| 5 | R2 | — | — | L1 | 15 | F1 | 10 |
| 6 | R2 | — | — | L2 | 15 | F1 | 10 |
| 7 | R2 | — | — | L1 | 15 | F2 | 10 |
| 8 | R2 | — | — | L2 | 15 | F2 | 10 |
| 9 | R1 | P2 | 150 | L1 | 7.5 | F1 | 10 |
| 10 | R1 | P1 | 150 | L1 | 7.5 | — | — |
| 11 | R1 | P1 | 20 | L1 | 7.5 | — | — |
| 12 | R1 | P1 | 66.7 | L1 | 7.5 | — | — |
| 13 | R1 | P3 | 66.7 | L1 | 7.5 | — | — | where E: embodiment,
*1 R1: polycaprolactam (6-nylon), R2: polylaulolactam (12-nylon), P1: modified polyethylene, P2: polyethylene, P3: polypropylene, L1: ester oil, L2: silicone oil, F1: talc powder, F2: active carbon;
*2 Part by weight for 100 parts by weight of the synthetic resin;
*3 Part by weight for 100 parts by weight of the synthetic resin containing the polyolefin resin;
*4 Part by weight for 100 parts by weight of the synthetic resin containing the olefin resin and the oil or the synthetic resin containing the oil.

TABLE 3

| | | Friction torque (kgf-cm) after aging | | | | wear depth |
|---|---|---|---|---|---|---|
| | | 5 min. | 1 hour | 10 hours | 70 hours | (mm) |
| E | 1 | 1.10 | 0.95 | 1.00 | 0.90 | 0.065 |
| | 2 | 0.90 | 0.75 | 0.90 | 0.85 | 0.080 |
| | 3 | 1.35 | 1.10 | 1.05 | 1.05 | 0.015 |
| | 4 | 1.05 | 0.85 | 0.90 | 1.00 | 0.020 |
| | 5 | 1.55 | 1.50 | 1.50 | 1.45 | 0.010 |
| | 6 | 1.45 | 1.35 | 1.30 | 1.40 | 0.020 |
| | 7 | 1.65 | 1.55 | 1.50 | 1.55 | 0.015 |
| | 8 | 1.50 | 1.50 | 1.40 | 1.40 | 0.030 |
| | 9 | 1.45 | 1.50 | 1.55 | 1.50 | 0.035 |
| | 10 | 0.85 | 0.80 | 0.90 | 0.85 | 0.055 |
| | 11 | 0.90 | 0.90 | 0.95 | 1.00 | 0.010 |
| | 12 | 0.80 | 0.75 | 0.70 | 0.75 | 0.010 |
| | 13 | 1.65 | 1.70 | 1.65 | 1.75 | 0.025 |
| C | 1 | 2.05 | 2.30 | 2.25 | 3.25 | 0.090 |
| | 2 | 2.20 | 2.55 | 2.30 | 3.50 | 0.095 |
| | 3 | 2.05 | 2.40 | 2.10 | 3.00 | 0.030 |
| | 4 | 2.50 | 3.05 | 2.90 | 3.00 | 0.010 |
| | 5 | 2.35 | 2.70 | 2.50 | 2.95 | 0.010 | where E: embodiment and C: comparison example.

As shown in table 3, the sliding bearing of each of the embodiments composed of the resin composition containing the oil in the presence of the polyolefin resin allowed the initral friction torque to be smaller than those of comparison examples. Further, the former maintained the initial friction torque for a longer period of time than the latter. That is, the oil-preserving performance of the former was more favorable than the latter.

Embodiment 14

A polymer alloy was formed by mixing 100 parts by weight of the polylaulolactam (12-nylon) resin (Daiamid L1640 (trade name of Daicel-Huels Co., Ltd.)) and 11.1 parts by weight of the unmodified high molecular weight polyethylene (Lubmer L 4000 (trade name of Mitsui Petrochemical Industries Co., Ltd.)) with each other. Then, 8.4 parts by weight of the ester oil (Unister H-481R (trade name of NOF Co., Ltd.)) was added to 100 parts by weight of the polymer alloy. The mixture was pelleted to form it into a sliding bearing. Evaluations wer e made on the same items as those of the embodiment 1, using the obtained sliding bearing. The mixing ratio is shown in table 4. Measured results are shown in table 5.

Embodiment 15

A polymer alloy was formed by mixing 100 parts by weight of the polycaprolactam (6-nylon) resin (Amilan CM1007 (trade name of Toray Industries Co., Ltd.)) and 42.9 parts by weight of the modified polyethylene with each other. Then, 10.8 parts by weight of the ester oil (Unister H-481R (trade name of NOF Co., Ltd.)) was added to 100 parts by weight of the polymer alloy. The mixture was formed into the shape of a sliding bearing by injection molding. The modified polyethylene used in the embodiment 15 was the same as that of the embodiment 1. Evaluations were made on the same items as those of the embodiment 1, using the obtained sliding bearing. The mixing ratio is shown in table 4. Measured results are shown in table 5.

Embodiment 16

A sliding bearing was formed by molding a material in the same condition and method as those of the embodiment 15 except that 1.6 parts by weight of graphite (Lonza KS-10 (trade name of Lonza Co., Ltd.)) was added to 100 parts by weight of the polymer alloy consisting of the polycaprolactam (6-nylon) resin and the modified polyethylene. Evaluations were made on the same items as those of the embodiment 1, and shade was checked, using the obtained sliding bearing. The mixing ratio is shown in table 4. Measured results are shown in table 5.

Embodiment 17

Sprues, runners, and molded products composed of the same resinous material as that of the embodiment 16 were crushed by a crusher. The pellet was molded by injection molding. Then, the same operation was performed three times repeatedly to form a reproduction material composed of the same material as that of the embodiment 16. The reproduction material and an unused virgin material made of the same material as that of the embodiment 16 were mixed with each other at a weight ratio of 8:2 to process the mixture into the shape of a sliding bearing by injection molding. Evaluations were made on the same items as those of the embodiment 1, and shade was checked, using the obtained sliding bearing. The mixing ratio is shown in table 4. Measured results are shown in table 5.

Embodiment 18

21.5 parts by weight of the ester oil (Unister H-481R (trade name of NOF Co., Ltd.)) was added to 100 parts by weight of the polymer alloy (Lubmer LS4160 (trade name of Mitsui Petrochemical Industries Co., Ltd.)). The polymer alloy consisting of the 100 parts by weight of the polycaprolactam (6-nylon) resin and 20–60 parts by weight of the modified polyethylene. The mixture was processed into the shape of a sliding bearing by injection molding.

Evaluations were made on the same items as those of the embodiment 1, using the obtained sliding bearing. The mixing ratio is shown in table 4. Measured results are shown in table 5.

COMPARISON EXAMPLE 6

The polymer alloy (Lubmer LS4160 (trade name of Mitsui Petrochemical Industries Co., Ltd.)) consisting of the 100 parts by weight of the polycaprolactam (6-nylon) resin and 20–60 parts by weight of the modified polyethylene was processed into the shape of a sliding bearing by injection molding. Evaluations were made on the same items as those of the embodiment 1, using the obtained sliding bearing. The mixing ratio is shown in table 4. Measured results are shown in table 5.

TABLE 4

|  | | Polyolefin | | Oil | | O.P.M | | Pig. |
|---|---|---|---|---|---|---|---|---|
|  | SR | kind | R*2 | kind | R*3 | kind | R | R*4 |
| E14 | R2 | P1 | 11.1 | L1 | 8.4 | — | — |  |
| E15 | R1 | P1 | 42.9 | L1 | 10.8 | — | — |  |
| E16 | R1 | P1 | 42.9 | L1 | 10.9 | — | — | 1.6 |
| E17 | R1 | P1 | 42.9 | L1 | 10.9 | — | — | 1.6 |
| E18 | R3 | — | — | L1 | 21.5 | — | — | — |
| C 6 | R3 | — | — | — | — | — | — | — | where E: embodiment, C: comparison example, SR: synthetic resin, O.P.M: oil preserving material, Pig.: pigment, R: ratio, R1: polycaprolactam (6-nylon), R2: polylaulolactam (12-nylon), R3: polymer alloy of polycaprolactam (6-nylon) resin and modified polyethylene, P1: modified polyethylene, L1: ester oil, R*2: Part by weight for 100 parts by weight of the synthetic resin, R*3: Part by weight for 100 parts by weight of the synthetic resin containing the polyolefin resin, R*4: Part by weight for 100 parts by weight of the synthetic resin containing the olefin resin and the oil or the synthetic resin containing the oil.

TABLE 5

|  | Friction torque (kgf-cm) | | | | Wear | |
|---|---|---|---|---|---|---|
|  | 5 min. | 1 h. | 10 h. | 70 h. | depth | shade |
| E 14 | 1.00 | 1.05 | 1.05 | 1.00 | 0.045 |  |
| E 15 | 1.05 | 0.95 | 1.00 | 1.05 | 0.035 |  |
| E 16 | 1.00 | 1.00 | 1.05 | 1.05 | 0.045 | black |
| E 17 | 1.05 | 1.00 | 0.95 | 1.05 | 0.050 | black |
| E 18 | 1.00 | 0.95 | 1.00 | 0.95 | 0.050 |  |
| C 6 | 2.05 | 2.00 | 2.10 | 2.50 | 0.090 |  | where E: embodiment, C: comparison example, and h.: hour

As indicated in table 5, the sliding bearing of each of the embodiments composed of the resin composition containing the oil in the presence of the polyolefin resin allowed the initial friction torque to be smaller than those of comparison examples. Further, the former maintained the initial friction torque for a longer period of time than the latter. That is, the oil-preserving performance of the former was more favorable than the latter. Further, the sliding bearing of embodiment 17 containing the reclaimed material and pigment had the same shade as that of the sliding bearing composed of a virgin material and further, the friction torque and wear depth of the former were almost the same as those of the latter.

As described above, because the sliding member of the present invention contains at least the polyolefin resin and the oil, it has a superior oil-preserving performance. Consequently, the sliding member has an excellent initial sliding characteristic and is capable of keeping it for a long time.

Because the sliding bearing portion of the sliding bearing unit of the present invention is formed of the sliding member, the initial friction torque can be allowed to be small and can be maintained for a long time.

The developing apparatus of the present invention allows the driving torque to be reduced because the sliding bearing unit is used at the shaft-supporting portion thereof. Consequently, developing apparatus allows a motor having a low output to be used as its driving source and is thus compact.

What is claimed is:

1. A sliding member for sliding bearing unit of an electrophotography apparatus, composed of a molded resin composition, said composition comprising, a polymer alloy of a polyolefin resin and a thermoplastic synthetic resin different from the polyolefin resin, and a lubricating oil, wherein 0.5–30 parts by weight of the lubricating oil is added to 100 parts by weight of the polymer alloy, said polymer alloy consisting essentially of 100 parts by weight of the thermoplastic synthetic resin and 5–200 parts by weight of the polyolefin resin.

2. A sliding member according to claim 1, wherein the polyolefin resin comprises at least one resin selected from the group consisting of polyethylenes and modified polyethylenes.

3. A sliding member according to claim 2, wherein the polyolefin resin is polyethylene.

4. A sliding member according to claim 2, wherein the polyolefin resin is a modified polyethylene.

5. A sliding member according to claim 4, wherein the modified polyethylene is a graft polymer of a polyethylene grafted with an α, β-unsaturated carboxylic acid or its derivatives.

6. A sliding member according to claim 1, wherein the lubricating oil consist essentially of at least one lubricating oil selected from the group consisting of silicone oil having no functional group and ester oil.

7. A sliding member according to claim 6, wherein the lubricating oil is ester oil.

8. A sliding member according to claim 1, wherein the synthetic resin is a polyamide resin.

9. A sliding member according to claim 8, wherein the polyamide resin is a polycaprolactum.

10. A sliding member according to claim 8, wherein the polyamide resin is a polylaulolactam.

11. A sliding member according to claim 1, wherein the resin composition contains an oil-preserving material.

12. A sliding member according to claim 1, wherein the resin composition contains a pigment.

13. A sliding member according to claim 12, wherein the pigment is a black pigment.

14. A sliding member according to claim 1, wherein the lubricating oil is an ester oil, the thermoplastic synthetic resin is a polyamide resin, the polyolefin resin is a modified ethylene.

15. A sliding member for a sliding bearing unit of an electrophotography apparatus, composed of a molded resin composition, the composition comprising,
a polyamide resin having a chemical structure containing not less than 10 methylene units between amide bonds, and a lubricating oil.

16. A sliding member according to claim 15, wherein the polyamide resin is polylaulolactam.

17. A sliding member according to claim 15, wherein the resin composition further comprises an oil-preserving material.

18. A sliding member according to claim 15, wherein the resin composition further comprises a pigment.

19. A sliding member according to claim 18, wherein the pigment is a black pigment.

20. A sliding member for sliding bearing unit of an electrophotography apparatus, composed of a molded resin composition, the composition comprising,
a polyamide resin having a chemical structure containing not less than 10 methylene units between amide bonds, and a lubricating oil,
wherein the resin composition comprises 100 parts by weight of the polyamide resin and 1–25 parts by weight of the lubricating oil.

21. A sliding member for sliding bearing unit of an electrophotography apparatus, composed of a molded resin composition, said composition comprising, a polymer alloy of a polyolefin resin and a thermoplastic synthetic resin different from the polyolefin resin, and a lubricating oil, wherein the polyolefin resin is a modified polyethylene.

22. A sliding member according to claim 21, wherein the modified polyethylene is a graft polymer of a polyethylene grafted with α, β-unsaturated carboxylic acid or its derivatives.

23. A sliding bearing unit of an electrophotography apparatus comprising a housing and a sliding bearing portion having a sliding characteristic,
   wherein the sliding bearing portion is formed of the sliding member, said sliding member being composed of a molded resin composition, said composition comprising,
   a polyamide resin having a chemical structure containing not less than 10 methylene units between amide bonds, and a lubricating oil.

24. A sliding bearing unit according to claim 23, wherein the sliding bearing portion is formed by injection molding.

25. A sliding bearing unit of an electrophotography apparatus comprising a sliding bearing portion, wherein the sliding bearing portion is formed of the sliding member, said sliding bearing for sliding bearing unit, composed of a molded resin composition, said composition comprising, a polyamide resin having a chemical structure containing not less than 10 methylene units between amide bonds, and a lubricating oil.

26. A developing apparatus comprising an electrostatic latent image-forming means, a toner supply means, a developing means, and a transfer means,
   wherein a sliding bearing unit installed on at least one part of the developing apparatus is the sliding bearing unit according to claim 25.

27. A sliding bearing unit of an electrophotography apparatus which consists of a molded resin composition, said composition consisting essentially of a polymer alloy of a polyamide resin having a chemical structure containing not less than 10 methylene units between amide bonds and a polyolefin resin, and a lubricating oil.

28. A sliding member for a slide bearing unit of an electrophotography apparatus, composed of a molded resin composition, the composition comprising,
   a polyamide resin having a chemical structure containing not less than 10 methylene units between amide bonds, and a lubricating oil,
   wherein the lubricating oil consists essentially of at least one lubricating oil selected from the group consisting of silicone oil having no functional group and ester oil.

29. A sliding bearing unit of an electrophotography apparatus comprising a sliding bearing portion,
   wherein the sliding bearing portion is formed of the sliding member, said sliding member for sliding bearing unit, composed of a molded resin composition, said composition comprising,
   a polyamide resin having a chemical structure containing not less than 10 methylene units between amide bonds, and a lubricating oil,
   wherein the lubricating oil consists essentially of at least one lubricating oil wherein the lubricating oil consists essentially of at least one lubricating oil selected from the group consisting of silicone oil having no functional group and ester oil.

30. A sliding bearing unit of an electrophotography apparatus comprising a housing and a sliding bearing portion having a sliding characteristic,
   wherein the sliding bearing portion is formed of the sliding member, said sliding member for sliding bearing unit, composed of a molded resin composition, said composition comprising,
   a polyamide resin having a chemical structure containing not less than 10 methylene units between amide bonds, and a lubricating oil,
   wherein the lubricating oil consists essentially of at least one lubricating oil selected from the group consisting of silicone oil having no functional group and ester oil.

* * * * *